United States Patent [19]

Funk et al.

[11] Patent Number: 4,642,766
[45] Date of Patent: Feb. 10, 1987

[54] METHOD AND MEANS OF CONTROL FOR MULTI-SOURCE FEEDSTOCK DISTRIBUTION SYSTEM INCLUDING OPTIMIZATION OF SUPPLIES

[75] Inventors: Gary L. Funk; Robert D. Terhune; Cheryl C. Kania; Robert H. Kallenberger, all of Bartlesville, Okla.

[73] Assignee: Phillips Petroleum Company, Bartlesville, Okla.

[21] Appl. No.: 709,234

[22] Filed: Mar. 6, 1985

[51] Int. Cl.$^4$ ............................................. G06F 15/46
[52] U.S. Cl. ................................ 364/402; 137/597; 364/500; 364/502
[58] Field of Search ............... 364/402, 500, 502, 156, 364/172, 131; 137/597

[56] References Cited

U.S. PATENT DOCUMENTS

| | | | |
|---|---|---|---|
| 3,048,331 | 8/1962 | Nice | 364/156 |
| 3,107,526 | 10/1963 | Kuntz | 73/195 |
| 3,134,017 | 5/1964 | Burhans | 364/402 |
| 3,309,507 | 3/1967 | Sehlein | 364/502 |
| 3,443,078 | 9/1966 | Noronha | 364/402 |
| 3,475,392 | 10/1969 | McCoy | 526/60 |
| 3,940,600 | 2/1976 | Alexander | 364/502 |
| 4,332,590 | 6/1982 | Smith | 436/555 |
| 4,371,994 | 2/1983 | Stewart | 364/502 |

FOREIGN PATENT DOCUMENTS 2081119  2/1982  United Kingdom ................ 137/597

Primary Examiner—Jerry Smith
Assistant Examiner—G. Hayes
Attorney, Agent, or Firm—French and Doescher

[57] ABSTRACT

A multi-source feedstock distribution system is controlled by an optimization so as to substantially minimize the total cost of the feed while also meeting set points for flow rate and composition to feedstock users supplied by the multi-source feedstock distribution system.

5 Claims, 3 Drawing Figures 4,642,766

METHOD AND MEANS OF CONTROL FOR MULTI-SOURCE FEEDSTOCK DISTRIBUTION SYSTEM INCLUDING OPTIMIZATION OF SUPPLIES

BACKGROUND OF THE INVENTION

This invention relates to a multi-source feedstock distribution system for a plurality of manufacturing processes. In one aspect this invention relates to method and apparatus for controlling the acquisition of fresh feed from a plurality of sources and the distribution of such fresh feed to a plurality of processes, which utilize the feed, in such a manner that feed rate and composition set points are satisfied while maintaining a substantially minimum feed cost.

The present invention was applied to a multi-source feedstock distribution system for an ethylene manufacturing process and will be described in terms of such a system. However, the invention is applicable to the control of any multi-source feedstock distribution system where it is desired to meet feed rate and composition set points while still maintaining a substantially minimum feed cost.

Ethylene processes, which also produce propylene if propane is included in the feed, employ huge volumes of ethane and propane. The feed rate to such plants will often be at least 200,000 pounds per hour.

A number of sources are generally required for the volume of feed required by an ethylene process. Typically, gas from a number of suppliers is stored in storage tanks and gases are withdrawn from the storage tanks as is required to meet the feed requirements of the ethylene process. Also, a plurality of ethylene processes or other processes which utilize propane or ethane are generally fed from the storage tanks.

A plurality of storage tanks are typically utilized. As an example, one storage tank might contain gases having a concentration of about 65 percent ethane, another storage tank might contain gases having a concentration of about 5 percent ethane and a third storage tank might contain gases having a concentration of about 35 percent ethane. Thus, the ethane concentration in the gas from a particular supplier would be determined and this gas would be provided to one of a plurality of storage tanks based on such concentration. The gases in the storage tanks would be mixed and provided as feed to user processes.

With such a large volume of feed it is essential that the feedstock cost be minimized if the plant is to be competitive. This requires an examination of the prices charged by various suppliers and the volume of gas which can be provided at certain prices. In some cases, prices may change if higher volumes are purchased from a particular supplier. Also, contract considerations may require purchasing a certain volume of gas from a particular supplier to avoid penalties.

In the past, it has been typical to minimize feedstock cost and also add feeds as required to meet specified user flow rates. However, this past approach has ignored the resulting feedstock composition. The users have been forced to use whatever feedstock composition is supplied which can result in production losses.

It is thus an object of this invention to provide control of a multi-source feedstock distribution system so that both the feed rate and the composition set points are achieved while also substantially minimizing feed cost.

SUMMARY OF THE INVENTION

In accordance with the present invention, set points for the flow rate and composition, where composition is relevant, are specified for each of the end users of a multi-source feedstock distribution system. An analysis of each source's feedgas is also obtained. Based on the set ponts and the analysis, an optimization is performed and set points are determined for the flow rate of the feed from various suppliers and also for the flow rate of the feed to the various end users serviced. In this manner, the cost of the feed is substantially minimized while also meeting set points for flow rate and composition. Substantial savings are thus realized in the feedstock cost without losing such savings by production losses caused by less than optimum feed compositions being provided to the various end users.

Other objects and advantages of the invention will be apparent from the foregoing brief description of the invention and the claims as well as the detailed description of the drawings which are briefly described as follows:

DESCRIPTION OF THE PREFERRED EMBODIMENT

As previously stated, the control system is described in terms of a specific multi-source feedstock distribution system to which the present invention was applied. However, the invention is applicable to any multi-source feedstock distribution system where it is desired to maintain desired set points for feed rate and composition and also to substantially minimize cost. The present invention can be applied to very simple multi-source feedstock distribution systems or can be applied to very complex systems where hundreds of suppliers are utilized and the feedstock is distributed to many processes.

Figure 2:
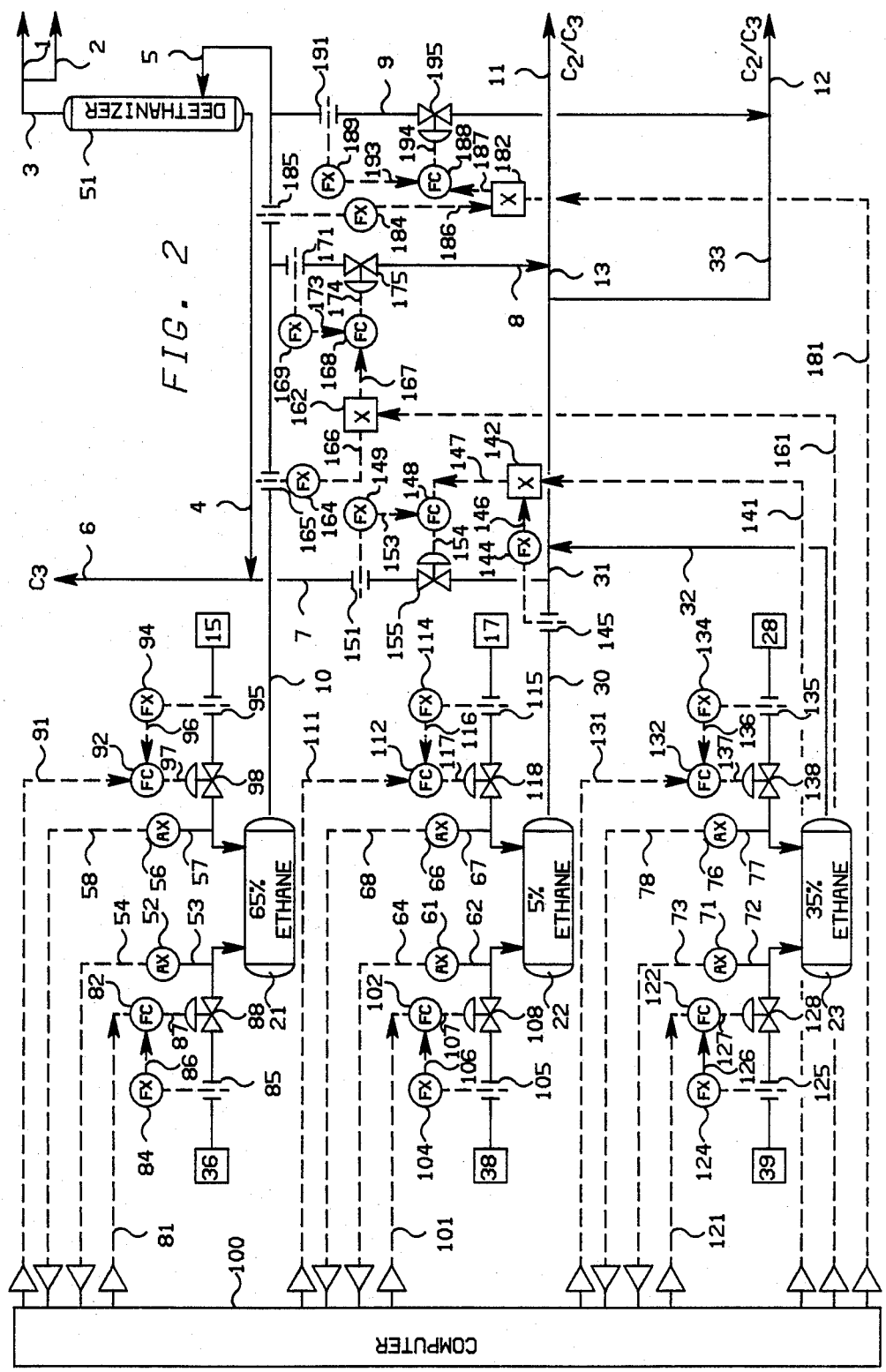
FIG. 2 is a diagrammatic illustration of a more complex multi-source feedstock distribution system than that illustrated in FIG. 1 and the associated control system of the present invention.

A specific control system configuration is set forth in FIG. 2 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that, if a flow is measured in pneumatic form, it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. The digital computer is preferably on OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Figure 1:
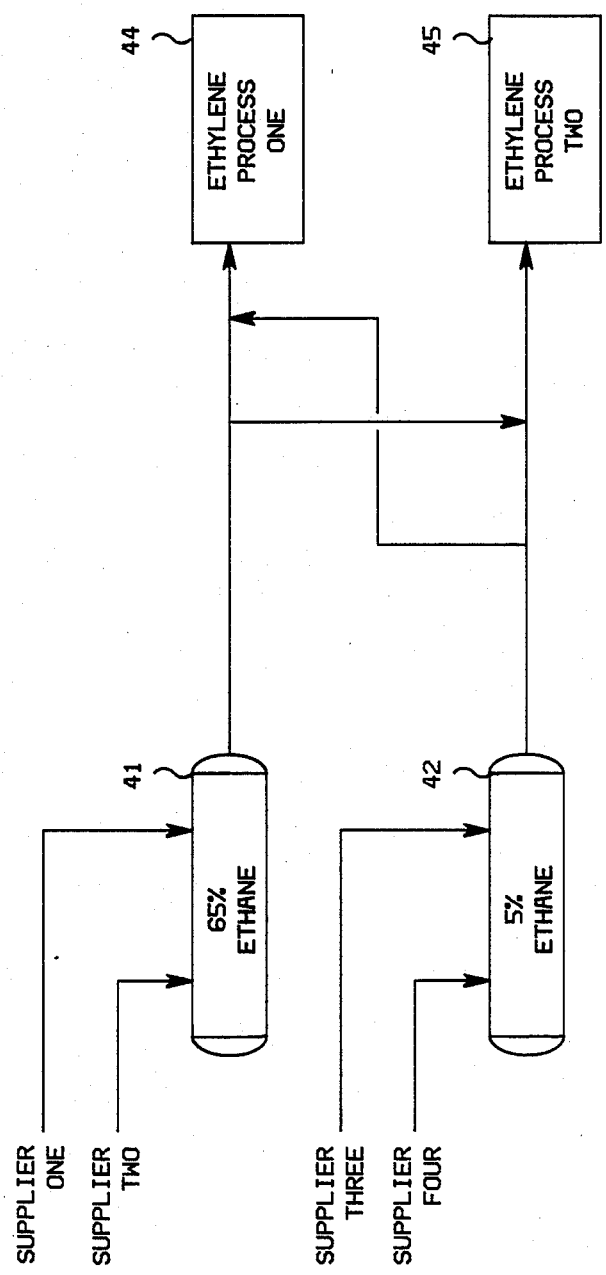
FIG. 1 is a diagrammatic illustration of a very simple multi-source feedstock distribution system.

Referring now to FIG. 1, there is illustrated a very simple multi-supplier feedstock distribution system serving two ethylene processes which both employ an ethane/propane mix as a feed. Two suppliers (supplier 1 and supplier 2) supply gas having a concentration of about 65 percent ethane to the storage tank 41. In like manner, two suppliers (supplier 3 and supplier 4) supply gas having a concentration of about 5 percent ethane to the storage tank 42. The gases from the storage tanks 41 and 42 are mixed and provided as a feed to the ethylene processes 44 and 45. There will be some desired composition (ethane/propane mix) for the feed to the ethylene processes 44 and 45. In many cases this desired composition will be different for the two ethylene processes. Also, there will be some desired feed flow rate to the two ethylene processes and the feed flow rates will also often be different.

Further, the cost of the feed from suppliers 1-4 will generally be different and there may be contract considerations such that some minimum must be purchased from one supplier or if a maximum is exceeded then the price goes up.

As has been previously stated, in the past it has been common to determine the least expensive feed and utilize this feed, plus makeup gas as required to satisfy required flow rates, regardless of composition. Thus, some ethane-propane mix would be provided to the ethylene processes 44 and 45 but this mix might not be the optimum for the production of ethylene and propylene.

The present invention utilizes an optimization as will be described more fully hereinafter. Essentially, an analysis of the gases from suppliers 1-4 plus cost information and set points for composition and feed rates is utilized to determine the required flow rate for the suppliers and also the required flow rate from the storage tanks 41 and 42 to the ethylene processes 44 and 45. Essentially, the flow rate of the supplied gases to the storage tanks 41 and 42 will determine the total flow rate to the ethylene processes 44 and 45 with control based on composition set points and required flow rates being utilized to determine the mix of the gases from storage tanks 41 and 42. This optimization thus achieves the desired minimization of cost and also maintains the desired compositions and flow rates for the feeds to the ethylene processes 44 and 45.

While the present invention may be applied to a multi-supplier feedstock distribution as simple as that illustrated in FIG. 1, generally multi-supplier feedstock distribution systems are much more complex. Such a more complex multi-supplier distribution system is illustrated in FIG. 2. The present invention was actually applied to such a multi-supplier feedstock distribution system. However, for the sake of illustration only two of the suppliers to each of the storage tanks is illustrated in FIG. 2. Actual numbers of these suppliers are utilized to correspond to numbers utilized in the examples of the optimization which will be discussed hereinafter. Also, actual numbers for the conduits are utilized so as to provide correspondence for the examples of the optimization.

Referring now to FIG. 2, there is illustrated three storage tanks 21, 22 and 23. Suppliers 15 and 36 supply gases having a concentration of about 65 percent ethane to the storage tank 21. In like manner, suppliers 17 and 38 supply gases having a concentration of about 5 percent ethane to the storage tank 22 and suppliers 28 and 39 supply gases having a concentration of about 35 percent ethane to the storage tank 23.

It is noted that, while suppliers 15 and 36 will have a concentration of ethane of about 65 percent, this concentration will not be exact and an analysis is utilized for all suppliers to determine the exact concentration of not only ethane but also propane and other constituents of the gases supplied.

For the feedstock distribution system, conduits required for a material balance are separately numbered. Gases from storage tank 21 are withdrawn through conduit 10 and supplied through conduit 5 to the deethanizer 51. Gases from conduit 10 are also supplied through conduit 8 to conduit 11 and through conduit 9 to conduit 12. Conduits 11 and 12 are the main supply conduits to two ethylene processes employing an ethane/propane mix.

An overhead stream, which will principally contain ethane, is withdrawn through conduit 3 from the deethanizer 51. This ethane stream is supplied through conduits 1 and 2 to two processes requiring an ethane feed.

A bottoms stream, which will principally contain propane, is withdrawn through conduit 4 from the deethanizer 51. This bottoms stream is combined with the gases flowing through conduit 7, which will also principally be propane, and the resulting combination is supplied through conduit 6 to a process requiring a propane feed.

Gases are withdrawn through conduit 30 from the storage tank 22. Some of these gases are withdrawn through conduit 7 as previously described. The remaining gases flow through the combination of conduits 31 and 13 to conduit 11 or through conduit 33 to conduit 12.

Gases are withdrawn from storage tank 23 through conduit 32 and are supplied to conduit 31. These gases are distributed the same as the gases flowing through conduit 31 as previously described.

Essentially, the feedstock distribution system illustrated in FIG. 2 services five users. Two users supplied through conduits 1 and 2 require an ethane feed. One user supplied through conduit 6 requires a propane feed. Two users supplied through conduits 11 and 12 require an ethane/propane mix. Composition control is not important for the users supplied through conduits 1, 2 and 6. However, it is important to maintain desired flow rates of feed to these processes.

Composition control is extremely important for the ethylene processes employing the ethane/propane mix supplied through conduits 11 and 12. Also, flow rate control is important. Thus, desired compositions are maintained for the feed flowing through conduits 11 and 12 and desired flow rates are maintained for the feeds flowing through conduits 1, 2, 6, 11 and 12 as will be described more fully hereinafter. All of this is accomplished while still substantially minimizing the cost of the feed to all processes.

Additional equipment such as pumps, heat exchangers, additional control components, etc. would typically be associated with the multi-source feedstock distribution system illustrated in FIG. 2. However, such additional equipment have not been illustrated since these additional components play no part in the description of the present invention.

In general, control of the multi-source feedstock distribution system illustrated in FIG. 2 is accomplished by using process measurements, process set points and cost information to establish nine control signals. The process measurements will first be described and then the use of the control signals will be described. Thereafter, the manner in which the process measurements, process set points and cost information are utilized to generate the control signals will be described.

Analyzer transducer 52 is in fluid communication with the gases supplied by supplier 36 through conduit 53. Analyzer transducer 52 is preferably a chromatographic analyzer such as the model 102 chromatographic analyzer supplied by Applied Automation Inc. The chromatographic analyzer 52 provides an output signal 54 which is representative of the concentration, on a mass flow rate basis (such as lb/hr) of six components (methane, ethane, propane, isobutane, n-butane, pentane) to the storage tank 21 from the supplier 36. Signal 54 is provided as an output from the analyzer transducer 52 and is supplied to computer 100.

In like manner, analyzer transducers 56, 61, 66, 71 and 76 supply similar information as signals 58, 64, 68, 73 and 78 respectively for suppliers 15, 38, 17, 39 and 28 respectively. All of this analysis information is supplied to computer 100.

In response to the analysis of the supplier gases and in response to process set points and cost information, an optimization is performed as will be described more fully hereinafter. The results of the optimization is the desired flow rate for all of the supplied gases and also the desired flow rate for the gases flowing through conduit 7, 8 and 9 required to maintain the desired flow rates of feed to all users.

Signal 81 is representative of the desired flow rate of gases from supplier 36. Signal 81 is provided as the set point input to the flow controller 82.

Flow transducer 84 in combination with the flow sensor 85, which is operably located in the supply conduit for supplier 36, provides an output signal 86 which is representative of the actual flow rate of gases from supplier 36. Signal 86 is provided as the process variable input to the flow controller 82.

In response to signals 81 and 86, the flow controller 82 provides an output signal 87 which is responsive to the difference between signals 81 and 82. Signal 87 is scaled so as to be representative of the position of the control valve 88, which is operably located in the supply conduit for supplier 36, required to maintain the actual flow rate of the gases supplied from supplier 36 substantially equal to the desired flow rate represented by signal 81. Signal 87 is provided as a control signal from the flow controller 82 to the control valve 88 and the control valve 88 is manipulated in response thereto.

The flow rate of gases from suppliers 15, 38, 17, 39 and 28 are controlled in the same manner as previously described for the flow rate of gases from supplier 36 in response to signals 91, 101, 111, 121 and 131 respectively. Components of the flow control system which differ from components designated by a number in the eighties by a factor of some multiple of 10 function in the same manner as described for components having numbers in the eighties.

Signal 141 is representative of the percentage of the feedgas flowing through conduit 30 which should be split off through conduit 7. Signal 141 is provided as a first input to the multiplying block 142.

Flow transducer 144 in combination with the flow sensor 145, which is operably located in conduit 30, provides an output signal 146 which is representative of the actual flow rate of feed through conduit 30. Signal 146 is provided as a second input to the multiplying block 142.

Signal 141 is multiplied by signal 146 to establish signal 147 which is representative of the desired flow rate of feed through conduit 7. Signal 147 is supplied as the set point input to the flow controller 148.

Flow transducer 149 in combination with flow sensor 151, which is operably located in conduit 7, provides an output signal 153 which is representative of the actual flow rate of feed through conduit 7. Signal 153 is provided as the process variable input to the flow controller 148.

In response to signals 147 and 153, the flow controller 148 provides an output signal 154 which is responsive to the difference between signals 153 and 147. Signal 154 is scaled so as to be representative of the position of control valve 155, which is operably located in conduit 7, required to maintain the actual flow rate of feed through conduit 7 substantially equal to the desired flow rate represented by signal 147. Signal 154 is provided as a control signal to the control valve 155 and the control valve 155 is manipulated in response thereto.

Signal 161 is representative of the percentage of the feed flowing through conduit 10 which should be split off through conduit 8. In like manner, signal 181 is representative of the percentage of the feed flowing through conduit 10 which should be split off through conduit 9. Signals 161 and 181 are utilized to manipulate the flow of feed through conduits 8 and 9 as previously described for the manipulation of the flow of feed through conduit 7 in response to signal 141. Numbers in the flow control for conduits 8 and 9 which vary by a factor of 20 from the numbers in the flow control system for conduit 7 perform the same functions as those previously described for the control of the flow through conduit 7.

The optimization essentially determines the total flow of feed to storage tanks 21, 22 and 23. This determines the amount of feed which can be withdrawn through conduits 10, 30 and 32 respectively. The splits controlled by control valves 155, 175 and 195 are then utilized to maintain desired feed flow rates to each of the five users.

Control of the flow rates and also of the compositions for the feed flowing through conduits 11 and 12 is accomplished by assigning penalties when the optimization, which will be described more fully hereinafter, calculates overall flow rates which would not meet the desired flow rates or maintain the desired compositions. The penalties are such that the flow rates to the users can not be below the specified value. Also, the penalties are such that the compositions for the feed flowing through conduits 11 and 12 will be driven very close to the desired value although there may be some variance if the actual cost of the feed is driven significantly higher in order to maintain exactly the desired composition.

Figure 3:
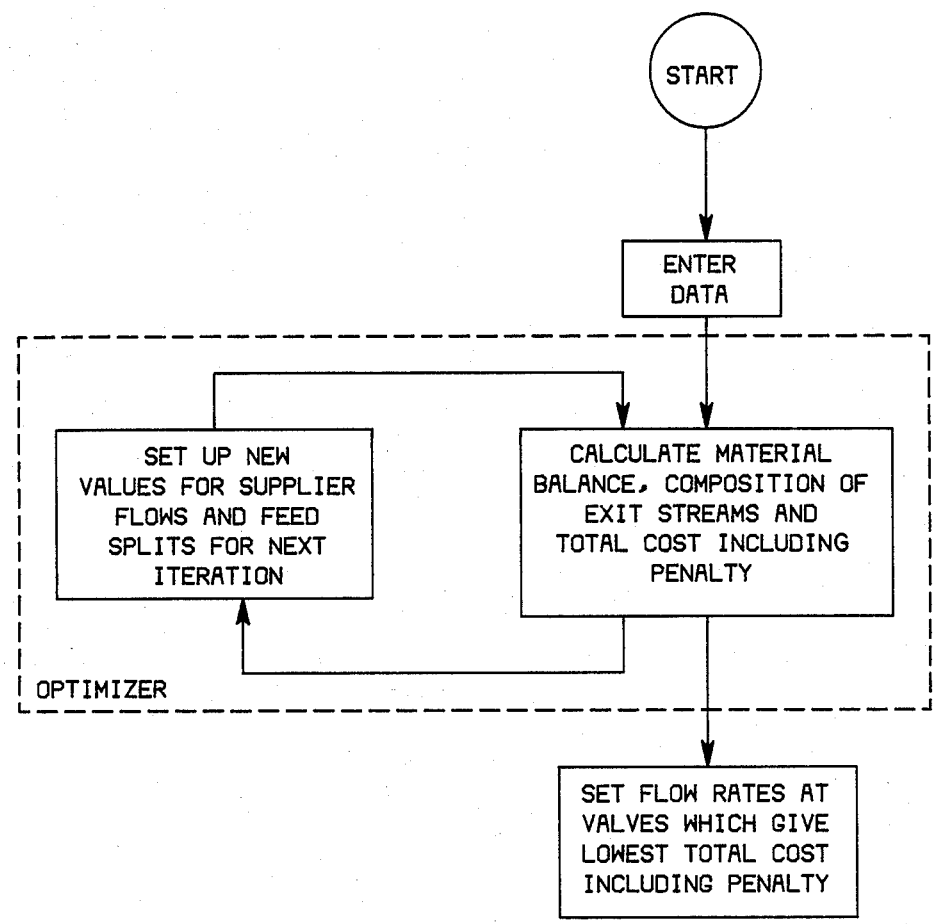
FIG. 3 is a logic diagram of the optimization utilized to derive the flow rate set points.

The optimization is illustrated in FIG. 3. Referring now to FIG. 3, data is first entered. This data will include at least the following:
1. The analysis of the gases supplied to storage tanks 21, 22 and 23.
2. An initial feed rate for all suppliers and an initial split for the feed distribution. The initial feed rate is generally set at the maximum allowable feed rate from each supplier and the initial splits are generally set based on experience with the process.
3. The cost of the feed from each supplier.
4. The desired composition (ethane/propane) for the feed flowing through conduits 11 and 12.
5. Weighting factors which determine the effect of a variation from the desired composition or a variation from the desired flow rates.

Based on the entered data, an optimization is performed to determine a set of flow rates which will give the lowest total cost including penalty. A material balance and the composition of each of the exit streams is first determined. It is noted that the flow rates utilized in such calculations are preferably mass flow rates. The use of other than mass flow rates provides very poor optimization.

After such calculations, the toal cost including penalty for variations from desired compositions is calculated. This total cost is stored in memory.

After the total cost for a particular data set is determined, a new set of values for the supplier flows and the feed splits is then determined. The calculation of material balance and composition of exit streams is then repeated and a second total cost including penalty is determined. This procedure is continued for a number of iterations until the optimizer determines that an optimum set of flow rates has been determined. At this point, this optimum set of flow rates is output as the control signals from computer 100 and these control signals are utilized as previously described.

It is noted that, throughout the optimization, the values for the supplier flows and the feed splits are restricted to values which will not allow the user flow rates to go below set points. Thus, a penalty is not calculated directly for a variation from user flow rate set points. However, such penalty will be calculated indirectly since user flow rates above set point will result in increased feed cost.

Any suitable optimizer may be utilized. A preferred optimization program is described in "Optimization Techniques With Fortran" by James L. Kuester and Joe H. Mize, McGraw-Hill Book Company, 1973.

A set of sample calculations for the optimization is set forth in Appendix I. The variables used in Appendix I are defined as follows:
 COMP (i,j)—the flow rate of component i in stream j in pounds per hour. Component 1 is methane, component 2 is ethane, component 3 is propane, component 4 is isobutane, component 5 is n-butane and component 6 is pentane.
 Xn—the total flow rate of stream n in lbs/hr.
 ALPn—the fraction split for stream n as represented by signals 141, 161 and 181.
 STCMP (i,j)—the weight fraction of component i in stream j.
 PRXN—the absolute error in propane composition (calculated composition minus desired composition) for stream n.

ERRN—a weighting factor for the composition error for stream n.

COMPERR—the effect of a composition error on the objective function.

STCOSTm—cost of feed from supplier m in dollars/hr.

PINDEX—total cost of supplier feed sources in dollars/hr.

COST—the objective function to be minimized. COST is the sum of the supplier cost (PINDEX) plus a calculated penalty for any composition error.

FRACn—the desired propane concentration for stream n.

AERROR—a weighting factor for a composition error.

SCALE—a weighting factor providing the relative significance of a composition error as opposed to cost.

Referring now to Appendix I, the data referred to above is first entered. Based on this data a first calculation of COST is made. The result of this first calculation was 40504 which may be considered a pseudo cost because it includes the penalty. However, it is an indication of the cost from a process standpoint of the assumed supplier feed flows and feed splits.

The values for the supplier flows and feed splits were then changed. COST was again calculated and the result was 37766.7. It is noted that both the actual cost and also the penalty was reduced by the second set of flow rates.

This process was repeated a third time and the COST was 34125.2 which is again below the previously calculated COST. This procedure would be continued until a minimum COST was determined and the supplier flow rates and feed splits for that minimum COST would be utilized as the set points for the control system as previously described.

In summary, the present control system achieves an optimization based on feed cost while still maintaining desired flow rates and compositions. This is a significant advance over previous control systems for multi-source feed distribution systems. An example of the savings provided by the present control system is the fact that current information indicates that a savings of $0.0005 per pound of total fresh feedstock is likely. For many ethylene plants this would result in a savings of about $1,000,000 per year.

The invention has been described in terms of a preferred embodiment as illustrated in FIGS. 1-3. Specific components which can be based in the practice of the invention as illustrated in FIG. 2 such as the flow sensors, flow transducers, flow controllers and control valves for each well known, commercially available control components such as are described at length in Perry's *Chemical Engineers Handbook,* 4th Edition, Chapter 22, McGraw-Hill. It is also noted that the multiplying blocks 142, 162 and 182 could be implemented in the computer 100 if desired.

While the invention has been described in terms of the presently preferred embodiment, reasonable variations and modifications are possible by those skilled in the art. Such modifications and variations include the application of the control system to a host of different multi-source feedstock distribution systems. Such modifications and variations are within the scope of the described invention and the appended claims.

APPENDIX I

DATA ENTERED
MEASURED COMPOSITIONS IN LBS/HR

| | |
|---|---|
| COMP(1,15) = 240.3 | COMP(1,36) = 48.384 |
| COMP(2,15) = 30269 | COMP(2,36) = 38276.5 |
| COMP(3,15) = 17296.6 | COMP(3,36) = 21324.5 |
| COMP(4,15) = 192.184 | COMP(4,36) = 204.28 |
| COMP(5,15) = 48.046 | COMP(5,36) = 48.046 |
| COMP(6,15) = 0.0 | COMP(6,36) = 0.0 |
| COMP(1,17) = 194.634 | COMP(1,38) = 253.908 |
| COMP(2,17) = 681.219 | COMP(2,38) = 1650.4 |
| COMP(3,17) = 95954.6 | COMP(3,38) = 124288.0 |
| COMP(4,17) = 486.585 | COMP(4,38) = 634.77 |
| COMP(5,17) = 0.0 | COMP(5,38) = 126.954 |
| COMP(6,17) = 0.0 | COMP(6,38) = 0.0 |
| COMP(1,28) = 127.566 | COMP(1,39) = 150.639 |
| COMP(2,28) = 4868.77 | COMP(2,39) = 14561.8 |
| COMP(2,28) = 16137.1 | COMP(3,39) = 34847.8 |
| COMP(2,28) = 106.305 | COMP(4,39) = 451.917 |
| COMP(2,28) = 21.261 | COMP(5,39) = 150.639 |
| COMP(2,28) = 0.0 | COMP(6,39) = 50.213 |

INITIAL VALUES FOR SUPPLIER FLOW RATES IN LBS/HR

X15 = 48046   X38 = 126954
X36 = 12096   X28 = 21261
X17 = 97317   X39 = 50213

INITIAL VALUES FOR FEED SPLITS

ALP7 = 0.4
ALP8 = 0.2
ALP9 = 0.0
FRAC 11 = 80%
FRAC 12 = 90%

CONSTRAINTS FOR USER FEED RATES

X3 = 25,600   X11 = 142,000
X6 = 98,000   X12 = 68,000

PRICES PER SUPPLIER IN $/LB

| | |
|---|---|
| ST COST (15) = .08798 | ST COST (36) = .0819131 |
| ST COST (17) = .104479 | ST COST (38) = .114135 |
| ST COST (28) = .099086 | ST COST (39) = .100794 |
| AERROR = .01 | |
| SCALE = .1 | |

APPENDIX I-continued

THE FIRST CALCULATION OF COST PROVIDES THE FOLLOWING RESULTS

| | | | | | |
|---|---|---|---|---|---|
| COMP(1,10) | = | COMP(1,15) | + | COMP(1,36) | = 288.614 (LBS/HR) |
| COMP(2,10) | = | COMP(2,15) | + | COMP(2,36) | = 38276.5 |
| COMP(3,10) | = | COMP(3,15) | + | COMP(3,36) | = 21324.5 |
| COMP(4,10) | = | COMP(4,15) | + | COMP(4,36) | = 204.28 |
| COMP(5,10) | = | COMP(5,15) | + | COMP(5,36) | = 48.046 |
| COMP(6,10) | = | COMP(6,15) | + | COMP(6,36) | = 0.0 |
| X10 | = | X15 | + | X36 | = 60142.0 (LBS/HR) |
| X8 | = | ALP8 · X10 | | | = 12028.4 |
| X9 | = | ALP9 · (X10 − X8) | | | = 0.0 |
| X5 | = | X10 − X8 − X9 | | | = 48113.6 |
| X4 | = | 17027.3 | | | |
| X3 | = | 31086.3 | | | |
| X30 | = | X17 | + | X38 | = 224271.0 |
| COMP(1,30) | = | COMP(1,17) | + | COMP(1,38) | = 448.542 |
| COMP(2,30) | = | COMP(2,17) | + | COMP(2,38) | = 2331.62 |
| COMP(3,30) | = | COMP(3,17) | + | COMP(3,38) | = 220242.6 |
| COMP(4,30) | = | COMP(4,17) | + | COMP(4,38) | = 1121.35 |
| COMP(5,30) | = | COMP(5,17) | + | COMP(5,38) | = 126.954 |
| COMP(6,30) | = | COMP(6,17) | + | COMP(6,38) | = 0.0 |
| X7 | = | ALP7 · X30 | | | = 89708.4 |
| X6 | = | X7 | + | X4 | = 106736. |
| X31 | = | X30 | − | X7 | = 134563. |
| X32 | = | X28 | + | X39 | = 71474. |
| X33 | = | X12 | − | X9 | = 68000. |
| X13 | = | X31 | + | X32 − X33 | = 138037 |
| X11 | = | X13 | + | X8 | = 150065. |

$$COMP(1,8) = COMP(1,10) * \frac{X8}{X10} = 57.7228$$

$$COMP(1,9) = COMP(1,10) * \frac{X9}{X10} = 0.0$$

$$COMP(1,7) = COMP(1,30) * \frac{X7}{X30} = 179.417$$

| | | | | | |
|---|---|---|---|---|---|
| COMP(1,31) | = | COMP(1,30) | − | COMP(1,7) | = 269.125 |
| COMP(1,32) | = | COMP(1,28) | + | COMP(1,39) | = 278.205 |
| COMP(1,13) | = | COMP(1,31) | + | COMP(1,32) | = 366.69 |
| COMP(1,33) | = | COMP(1,31) | + | COMP(1,32) | − COMP(1,13) = 180.64 |
| COMP(1,11) | = | COMP(1,13) | + | COMP(1,8) | = 424.413 |
| COMP(1,12) | = | COMP(1,33) | + | COMP(1,9) | = 180.64 |

$$COMP(2,8) = COMP(2,10) * \frac{X8}{X10} = 7655.3$$

$$COMP(2,9) = COMP(2,10) * \frac{X9}{X10} = 0.0$$

$$COMP(2,7) = COMP(2,30) * \frac{X7}{X30} = 932.648$$

| | | | | | |
|---|---|---|---|---|---|
| COMP(2,31) | = | COMP(2,30) | − | COMP(2,7) | = 1398.97 |
| COMP(2,32) | = | COMP(2,28) | + | COMP(2,39) | = 19430.5 |

$$COMP(2,13) = \frac{(COMP(2,31) + COMP(2,32)) * X13}{(X31 + X32)} = 13955.0$$

| | | | | | |
|---|---|---|---|---|---|
| COMP(2,33) | = | COMP(2,31) | + | COMP(2,32) | − COMP(2,13) = 6874.54 |
| COMP(2,11) | = | COMP(2,13) | + | COMP(2,8) | = 21610.3 |
| COMP(2,12) | = | COMP(2,33) | + | COMP(2,9) | = 6874.54 |

$$COMP(3,8) = COMP(3,10) * \frac{X8}{X10} = 4264.91$$

$$COMP(3,9) = COMP(3,10) * \frac{X9}{X10} = 0.0$$

$$COMP(3,7) = COMP(3,30) * \frac{X7}{X30} = 88097.0$$

| | | | | | |
|---|---|---|---|---|---|
| COMP(3,31) | = | COMP(3,30) | − | COMP(3,7) | = 132146.0 |
| COMP(3,32) | = | COMP(3,28) | + | COMP(3,39) | = 50984.9 |

$$COMP(3,13) = \frac{(COMP(3,31) + COMP(3,32)) * X13}{X31 + X32} = 122690.$$

| | | | | | |
|---|---|---|---|---|---|
| COMP(3,33) | = | COMP(3,31) | + | COMP(3,32) | − COMP(3,13) = 60440.1 |
| COMP(3,11) | = | COMP(3,13) | + | COMP(3,8) | = 126955. |
| COMP(3,12) | = | COMP(3,33) | + | COMP(3,9) | = 60440.1 |

APPENDIX I-continued $$\text{COMP}(4,8) = \text{COMP}(4,10) * \frac{X8}{X10} = 40.856$$

$$\text{COMP}(4,9) = \text{COMP}(4,10) * \frac{X9}{X10} = 0.0$$

$$\text{COMP}(4,7) = \text{COMP}(4,30) * \frac{X7}{X30} = 448.542$$

COMP(4,31) = COMP(4,30) − COMP(4,7) = 672.813
COMP(4,32) = COMP(4,28) + COMP(4,39) = 558.222

$$\text{COMP}(4,13) = \frac{(\text{COMP}(4,31) + \text{COMP}(4,32)) * X13}{(X31 + X32)} = 824.746$$

COMP(4,33) = COMP(4,31) + COMP(4,32) − COMP(4,13) = 406.289
COMP(4,11) = COMP(4,13) + COMP(4,8) = 865.602
COMP(4,12) = COMP(4,33) + COMP(4,9) = 406.289

$$\text{COMP}(5,8) = \text{COMP}(5,10) * \frac{X8}{X10} = 9.6092$$

$$\text{COMP}(5,9) = \text{COMP}(5,10) * \frac{X9}{X10} = 0.0$$

$$\text{COMP}(5,7) = \text{COMP}(5,30) * \frac{X7}{X30} = 50.7816$$

COMP(5,31) = COMP(5,30) − COMP(5,7) = 76.1724
COMP(5,32) = COMP(5,28) + COMP(5,39) = 171.9

$$\text{COMP}(5,13) = \frac{(\text{COMP}(5,31) + \text{COMP}(5,32)) * X13}{(X31 + X32)} = 166.199$$

COMP(5,33) = COMP(5,31) + COMP(5,32) − COMP(5,13) = 81.8734
COMP(5,11) = COMP(5,13) + COMP(5,8) = 175.808
COMP(5,12) = COMP(5,33) + COMP(5,9) = 81.8734

$$\text{COMP}(6,8) = \text{COMP}(6,10) * \frac{X8}{X10} = 0.0$$

$$\text{COMP}(6,9) = \text{COMP}(6,10) * \frac{X9}{X10} = 0.0$$

$$\text{COMP}(6,7) = \text{COMP}(6,30) * \frac{X7}{X30} = 0.0$$

COMP(6,31) = COMP(6,30) − COMP(6,7) = 0.0
COMP(6,32) = COMP(6,28) + COMP(6,39) = 50.213

$$\text{COMP}(6,13) = \frac{(\text{COMP}(6,31) + \text{COMP}(6,32)) * X13}{(X31 + X32)} = 33.6408$$

COMP(6,33) = COMP(6,31) + COMP(6,32) − COMP(6,13) = 16.5722
COMP(6,11) = COMP(6,13) + COMP(6,8) = 33.6408
COMP(6,12) = COMP(6,33) + COMP(6,9) = 16.5722

$$\text{STCMP}(3,11) = \frac{\text{COMP}(3,11)}{X11} = .8460 \text{ (WT FRACTION)}$$

$$\text{STCMP}(3,12) = \frac{\text{COMP}(3,12)}{X12} = .8888$$

PRX11 error = ABS(STCMP(3,11) − FRAC11) = .0460
PRX12 error = ABS(STCMP(3,12) − FRAC12) = .0112

$$\text{ERR11 error} = \left( \frac{(\text{STCMP}(3,11) - \text{FRAC11})}{(\text{FRAC11})(\text{AERROR})} \right)^2 = 33.0656$$

$$\text{ERR12 error} = \left( \frac{(\text{STCMP}(3,12) - \text{FRAC12})}{(\text{FRAC12})(\text{AERROR})} \right)^2 = 1-.54185$$

COMPERR = (ERR11 + ERR12) * 1000 * SCALE = 3460.74
PINDEX = STCOST(15) * X15 + STCOST(17) * X17 + STCOST(28) * X28 + STCOST(36) * X36 + STCOST(38) * X38 − STCOST(39) * X39
COST = PINDEX + COMPERR = 40504.

AFTER THE FIRST CALCULATION, THE OPTIMIZER MADE THE FOLLOWING CHANGES IN VARIABLES

X15 = 57046.0

APPENDIX I-continued

```
X36 = 21096.0
ALP8 = .2100
ALP9 = .00
X17 = 88317.0
X38 = 117954.0
ALP7 = .4100
X28 = 13037.3
X39 = 59213.0
```
REPEATING THE CALCULATION OF COST GIVES $$\text{STCMP}(3,12) = \frac{\text{COMP}(3,11)}{X11} = .818407$$

$$\text{STCMP}(3,12) = \frac{\text{COMP}(3,12)}{X12} = .879082$$

PRX11 = ABS(STCMP(3,11) − FRAC11) = .018407
PRX12 = ABS(STCMP(3,12) − FRAC12) = .0209184

$$\text{ERR11} = \left(\frac{(\text{STCMP}(3,12) - \text{FRAC11})}{\text{FRAC11} * \text{AERROR}}\right)^2 = 5.29409$$

$$\text{ERR12} = \left(\frac{(\text{STCMP}(3,12) - \text{FRAC12})}{\text{FRAC12} * \text{AERROR}}\right)^2 = 5.4022$$

```
COMPERR  = (ERR11 + ERR12)1000 * SCALE = 1069.63
PINDEX   = 36697.0
COST     = PINDEX + COMPERR = 37766.7
```
AFTER THE SECOND CALCULATION, THE OPTIMIZER MADE THE FOLLOWING CHANGES IN VARIABLES
```
X15 = 1.0
X36 = 63102.6
ALP8 = .395615
ALP9 = .0
X17 = 99999.0
X38 = 104337.0
ALP7 = .418239
X28 = 50560.7
X39 = 15600.0
```
REPEATING THE CALCULATION OF COST GIVES $$\text{STCMP}(3,11) = \frac{\text{COMP}(3,11)}{X11} = .797892$$

$$\text{STCMP}(3,12) = \frac{\text{COMP}(3,12)}{X12} = .897058$$

PRX11 = ABS(STCMP(3,11) − FRAC11) = .00210786
PRX12 = ABS(STCMP(3,12) − FRAC12) = .00294179

$$\text{ERR11} = \left(\frac{(\text{STCMP}(3,11) - \text{FRAC11})}{\text{FRAC11} * \text{AERROR}}\right)^2 = .0694229$$

$$\text{ERR12} = \left(\frac{(\text{STCMP}(3,12) - \text{FRAC12})}{\text{FRAC12} * \text{AERROR}}\right)^2 = .106841$$

```
COMPERR  = (ERR11 + ERR12)1000 * SCALE = 17.6264
PINDEX   = 34107.5
COST     = PINDEX + COMPERR = 34125.2
```

That which is claimed is:

1. A method for optimizing a multi-source feedstock distribution system, wherein a first feedstock from a first supplier and a second feedstock from a second supplier are supplied to a first storage tank, wherein a third feedstock from a third supplier and a fourth feedstock from a fourth supplier are supplied to a second storage tank, wherein the composition of the feeds provided from said first, second, third and fourth suppliers are different and wherein the concentration of a first component in said first storage tank is different than the concentration of said first component in said second storage tank, wherein at least a portion of the feedstock contained in said first storage tank is supplied to a first process and a second process, and wherein at least a portion of the feedstock contained in said second storage tank is supplied to said first process and said second process, said method comprising the steps of:

establishing a first signal representative of the composition of said first feedstock, a second signal representative of the composition of said second feedstock, a third signal representative of the composition of said third feedstock and a fourth signal representative of the composition of said fourth feedstock;

establishing a fifth signal representative of the desired composition of the total feedstock provided to said first process and a sixth signal representative of the desired composition of the total feedstock provided to said second process;

establishing a seventh signal representative of the desired total flow rate of the feedstock to said first process and an eighth signal representative of the desired total flow rate of the feedstock to said second process;

establishing, in response to said first through eighth signals, a ninth signal representative of the desired flow rate of said first feedstock to said first storage tank, a tenth signal representative of the desired flow rate of said second feedstock to said first storage tank, an eleventh signal representative of the desired flow rate of said third feedstock to said second storage tank, a twelfth signal representative of the desired flow rate of said fourth feedstock to said second storage tank, a thirteenth signal representative of the desired split of the feedstock from said first storage tank between said first process and said second process and a fourteenth signal representative of the desired split for the feedstock from said second storage tank between said first process and said second process, wherein said ninth through fourteenth signals are established based on an optimization such that the total cost of the feedstock is minimized while still meeting the compositions represented by said fifth signal and said sixth signal and the flow rates represented by said seventh signal and said eighth signal; and manipulating the flow rate of said first feedstock in response to said ninth signal, the flow rate of said second feedstock in response to said tenth signal, the flow rate of said third feedstock in response to said eleventh signal, the flow rate of said fourth feedstock in response to said twelfth signal, the split of the feedstock from said first storage tank between said first process and said second process in response to said thirteenth signal and the split of the feedstock from said second storage tank between said first process and said second process in response to said fourteenth signal.

2. A method in accordance with claim 1 wherein said first and second processes are ethylene manufacturing processes, wherein said first, second, third and fourth feedstocks contain both ethane and propane and wherein said first component is ethane.

3. A method in accordance with claim 2 wherein said first, second, third and fourth signals are each respectively representative of at least the concentration of ethane and propane in said first, second, third and fourth feedstocks respectively.

4. A method in accordance with claim 3 wherein said fifth signal is representative of the desired concentration of ethane and propane in the total feedstock provided to said first process and said sixth signal is representative of the desired concentration of ethane and propane in the total feedstock provided to said second process.

5. Apparatus comprising:

a first storage tank;

means for supplying a first feedstock from a first supplier to said first storage tank;

means for supplying a second feedstock from a second supplier to said first storage tank;

a second storage tank;

means for supplying a third feedstock from a third supplier to said second storage tank;

means for supplying a fourth feedstock from a fourth supplier to said second storage tank, wherein the composition of the feeds provided from said first, second, third and fourth suppliers are different and wherein the concentration of a first component in said first storage tank is different than the concentration of said first component in said second storage tank;

a first process;

a second process;

means for supplying at least a portion of the feedstock contained in said first storage tank to said first process and said second process;

means for supplying at least a portion of the feedstock contained in said second storage tank to said first process and said second process;

means for establishing a first signal representative of the composition of said first feedstock, a second signal representative of the composition of said second feedstock, a third signal representative of the composition of said third feedstock and a fourth signal representative of the composition of said fourth feedstock;

means for establishing a fifth signal representative of the desired composition of the total feedstock provided to said first process and a sixth signal representative of the desired composition of the total feedstock provided to said second process;

means for establishing a seventh signal representative of the desired total flow rate of the feedstock to said first process and an eighth signal representative of the desired total flow rate of the feedstock to said second process;

means for establishing, in response to said first through eighth signals, a ninth signal representative of the desired flow rate of said first feedstock to said first storage tank, a tenth signal representative of the desired flow rate of said second feedstock to said first storage tank, an eleventh signal representative of the desired flow rate of said third feedstock to said second storage tank, a twelfth signal representative of the desired flow rate of said fourth feedstock to said second storage tank, a thirteenth signal representative of the desired split of the feedstock from said first storage tank between said first process and said second process and a fourteenth signal representative of the desired split for the feedstock from said second storage tank between said first process and said second process, wherein said ninth through fourteenth signals are established based on an optimization such that the total cost of the feedstock is minimized while still meeting the compositions represented by said fifth signal and said sixth signal and the flow rates represented by said seventh signal and said eighth signal; and means for manipulating the flow rate of said first feedstock in response to said ninth signal, the flow rate of said second feedstock in response to said tenth signal, the flow rate of said third feedstock in response to said eleventh signal, the flow rate of said fourth feedstock in response to said twelfth signal, the split of the feedstock from said first storage tank between said first process and said second process in response to said thirteenth signal and the split of the feedstock from said second storage tank between said first process and said second process in response to said fourteenth signal.

* * * * *